(12) United States Patent
Hermey et al.

(10) Patent No.: US 11,566,685 B2
(45) Date of Patent: Jan. 31, 2023

(54) LINE GUIDING SYSTEM AND GUIDE TROUGH, IN PARTICULAR FOR HIGH DISPLACEMENT SPEEDS

(71) Applicant: igus GmbH, Cologne (DE)

(72) Inventors: Andreas Hermey, Hennef (DE); Thilo-Alexander Jaeker, Sankt Augustin (DE)

(73) Assignee: IGUS GMBH, Cologne (DE)

( * ) Notice: Subject to any disclaimer, the term of this patent is extended or adjusted under 35 U.S.C. 154(b) by 372 days.

(21) Appl. No.: 16/755,133

(22) PCT Filed: Oct. 8, 2018

(86) PCT No.: PCT/EP2018/077357
§ 371 (c)(1),
(2) Date: Apr. 9, 2020

(87) PCT Pub. No.: WO2019/072777
PCT Pub. Date: Apr. 18, 2019

(65) Prior Publication Data
US 2020/0325962 A1    Oct. 15, 2020

(30) Foreign Application Priority Data
Oct. 9, 2017    (DE) .................... 20 2017 106 108.6

(51) Int. Cl.
*F16G 13/16*    (2006.01)
*H02G 11/00*    (2006.01)

(52) U.S. Cl.
CPC ........... *F16G 13/16* (2013.01); *H02G 11/006* (2013.01)

(58) Field of Classification Search
CPC ............................. F16G 13/16; H02G 11/006
(Continued)

(56) References Cited

U.S. PATENT DOCUMENTS 6,387,002 B1    5/2002  Gunter
6,550,232 B1    4/2003  Achs et al.
(Continued)

FOREIGN PATENT DOCUMENTS

CN    1494640    5/2004
CN    1617986    5/2005
(Continued)

OTHER PUBLICATIONS

International Search Report from corresponding PCT Appln. No. PCT/EP2018/077357, dated Jan. 28, 2019.
(Continued)

*Primary Examiner* — Timothy J Thompson
*Assistant Examiner* — Michael F McAllister
(74) *Attorney, Agent, or Firm* — Grossman, Tucker, Perreault & Pfleger, PLLC (57) ABSTRACT

A dynamic line guiding system for high speeds and/or long displacement paths, with an energy chain arranged as lying on the side, which chain, in the configuration of a first strand, a second strand, as well as a deflection curve, is displaceable back and forth. The energy chain is guided in a guide trough with two laterally-opposite side walls and a trough floor therebetween, wherein each strand is respectively displaceable with a lateral surface on a respective bearing surface on the trough floor, and is held, relative to the outside, by means of one of the two side walls. It is provided that the trough (Continued)

floor comprises at least one bearing surface with a step or a ramp, which counteracts a deviation of the first strand out of its intended target location on the respective bearing surface.

21 Claims, 6 Drawing Sheets

(58) Field of Classification Search
USPC .......................................................... 59/78.1
See application file for complete search history.

(56) References Cited

U.S. PATENT DOCUMENTS

| | | | |
|---|---|---|---|
| 6,796,409 | B2 | 9/2004 | Hermey et al. |
| 6,945,027 | B2 | 9/2005 | Blase |
| 7,310,935 | B2 | 12/2007 | Worms |
| 9,325,159 | B2 | 4/2016 | Spies |
| 2002/0136471 | A1* | 9/2002 | Hermey .................. F16G 13/16 384/42 |
| 2003/0008740 | A1* | 1/2003 | Jonas .................... H02G 11/006 474/144 |
| 2010/0175363 | A1* | 7/2010 | Jaeker .................. H02G 11/006 59/78.1 |

FOREIGN PATENT DOCUMENTS

| | | |
|---|---|---|
| CN | 103470693 | 12/2013 |
| CN | 103782464 | 5/2014 |
| DE | 4113715 | 10/1992 |
| DE | 29706670 | 6/1997 |
| DE | 19742861 | 5/1999 |
| DE | 10033856 | 8/2002 |
| DE | 102007009329 | 8/2008 |
| DE | 202009005648 | 6/2009 |
| DE | 102012111545 | 5/2014 |
| DE | 202014104550 | 10/2014 |
| EP | 1705770 | 9/2006 |
| FR | 2841312 | 12/2003 |
| WO | 99/54640 | 10/1999 |

OTHER PUBLICATIONS

International Preliminary Report on Patentability from corresponding PCT Appln. No PCT/EP2018/077357, dated Jan. 22, 2020.
Search Report from related German Appln. No. 20 2017 106 108.6, dated Apr. 27, 2018.

* cited by examiner

LINE GUIDING SYSTEM AND GUIDE TROUGH, IN PARTICULAR FOR HIGH DISPLACEMENT SPEEDS

FIELD

The invention relates generally to a line guiding system for at least one supply line, including an energy guide for the dynamic guiding of a line, with a plurality of members which are respectively connected to one another in an articulated manner, as well as a guide trough with two laterally opposite side walls, and a trough floor therebetween, in which guide trough the energy guide can at least partially be received and guided along an intended track. The invention in particular relates to the structure of such a guide trough.

The invention relates to such a line guiding system and such a guide trough, which make high displacement speeds and/or long displacement paths of the energy guide possible.

BACKGROUND

Typically, an energy guide, in the configuration of a first strand, a second strand as well as a deflection curve which connects both strands, is displaceable back and forth. The term energy guide means, for the present invention, in the broad sense, any active line guiding unit, not only an energy chain as actual member chain of individual members, but rather e.g. also strap guides, in which members or strap segments are connected to one another via a pliable strap, or other units, bendable in at least one plane, for receiving and guiding lines between two connection points, of which at least one is relatively moveable to the other.

Due to reasons made apparent below, in the generic energy guide, at least one part of the members should each comprise at least one stable, link-like side part, with an inner main side and an outer main side, which side part is configured as flatly as possible.

In consumers, which move at great displacement speeds and accordingly, high accelerations or decelerations, such as e.g. in portal robots or other automation systems, difficulties arise in always providing the desired course along the intended track during operation. In addition, in the case of disruptions, e.g. through foreign bodies, a breaking-out of the lines out of the guide trough can occur.

E.g. DE 10 2007 009 329 A1 shows an arrangement prevalent today, namely with energy chains in conventional guide troughs, at linear portal units in overhead arrangement above automated processing units, without closer description of the line guiding system, however. Such arrangements are comparatively space-saving, they occupy only a small additional height above the linear axis, and are inherently suited for high speeds.

Figure 1A:
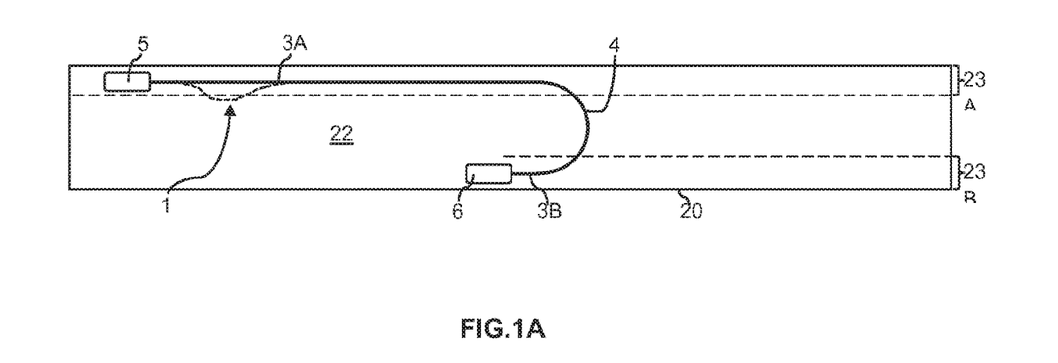
FIGS. 1A to 1C are schematic views of a line guiding system with an energy guide and a guide trough according to a lying arrangement known from the prior art, in a top view of an extended end position (FIG. 1A), or in a retracted end position (FIG. 1B) and in a cross-section (FIG. 1C)
Figure 1B:
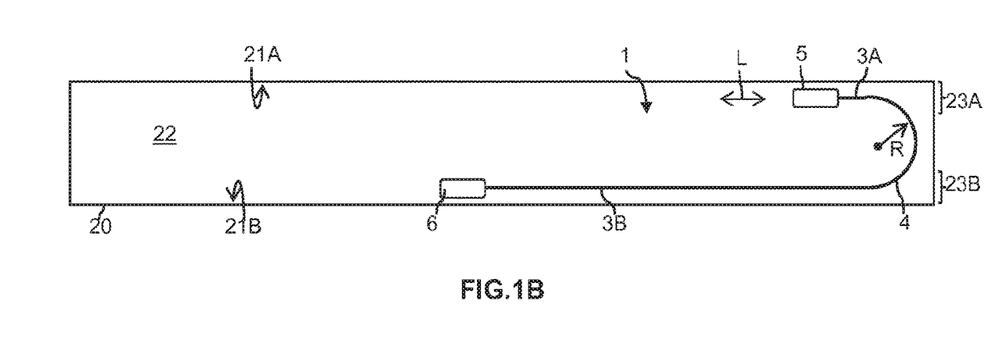
Figure 1C:
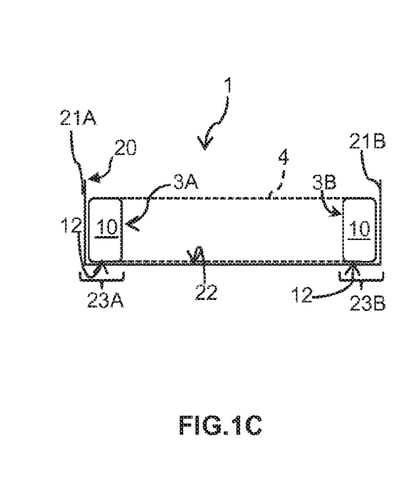

In the field of dynamic line guides, so-called arrangements of energy guides lying on the side are known, in which the strands extend horizontally next to one another. Such an arrangement is shown in FIGS. 1A-1C. In DE 10 2012 111 545 A1, a complex and maintenance-intensive mechanism with pivotable movement limits is proposed for the lying arrangement, which mechanism is meant to prevent uncontrolled movements of the driven strand, such as e.g. a breaking-out.

A further lying arrangement of an energy guide is described in FR 2 841 312 A1. In this case, the moved strand is mounted on rolls in the guide trough, in order to reduce friction. Additionally, the rolls have a conical or frusto-conical rolling surface, in order to additionally counteract a breaking-out.

Furthermore, in DE 100 33 856 A1, an arrangement lying on the side of an energy guide was suggested, with two lateral slide rails, which form guiding edges, and a higher arranged middle slide rail, on which the energy guide rests only punctiformly or linearly. Through the higher arranged middle slide rail, the deflection curve is raised, and the strands remain, through slight tilting, held in the guiding edges of the rails. Typical guide troughs shall, according to DE 100 33 856 A1, be avoided to reduce friction.

Arrangements lying on the side offer, even in high accelerations, a comparatively secure operation. The aforementioned solutions to avoid uncontrolled movements in lying energy guides are, however, technically relatively complicated in terms of production and are maintenance-intensive.

SUMMARY

According to a first aspect of the invention, a line guiding system and a guide trough are to be provided for the arrangement lying on the side, which line guiding system and guide trough, in an as simple as possible structure, make high displacement speeds or great accelerations or decelerations possible, in particular with low or no risk of a breaking-out of the lines.

First Aspect of the Invention

According to the first aspect of the invention, it is provided, in a generic arrangement, that the energy guide is arranged lying on the side in the guide trough, i.e. with the outer main sides of both strands facing towards the trough floor or opposite this. Correspondingly each strand is respectively, as it were, displaceable lying on the side on a corresponding bearing surface of the trough floor.

This does not correspond to the typical arrangement with strands arranged vertically above one another. A use of energy guides in a lateral position is, however, especially already known for circular movement paths for line guiding in rotational movements, e.g. from WO 2013/007631 A1 of the applicant.

According to the first aspect of the invention, it is now proposed that the trough floor comprises at least one guide surface with a cross-section extending obliquely to the horizontal, which guide surface is assigned to a bearing surface, at least of the first strand, in particular is arranged at this bearing surface. The at least one guide surface counteracts a deviation of the first strand out of its target location. The target location is dependent upon the position of the displaced strand end or to be understood as dynamic, and corresponds to the desired, nominal course of the strand on its bearing surface according to the intended use.

A core idea of the invention is hence to counteract at least the potentially out-breaking longitudinal portion of the moved or driven first strand with a height difference formed in or on the floor of the guide trough or trough floor, which height difference constitutes an obstacle against undesired deviations of the course. This can already be achieved through a guide surface with a cross-section extending obliquely to the horizontal. Here, a type of forced guiding of the moved strand can be achieved, e.g. between a side wall and the guide surface, or between the adjacent strand and the guide surface. As attempts at high speed show, undesired surging or out-breaking comes up approx. in the first end-side third of the catch-sided strand. It is therefore essentially sufficient to equip only this first strand and only this longitudinal area of the displacement path with the guide surface according to the invention. To homogenize the parts and simplify the assembly, the entire guide trough can, however, be equipped with the guide surface assigned to the lane of the strand, if necessary also symmetrically for both strands.

In one embodiment, the at least one guide surface can form a ramp, which, cross-sectionally, lies advantageously obliquely to the horizontal, similar to an oblique plane. In an alternative embodiment, the at least one guide surface can form a step, which, cross-sectionally, advantageously lies perpendicularly. It is also conceivable to combine both forms, e.g. with a step-like first region of lesser height and an adjoining oblique ramp, with brings about the remaining predetermined height difference. Here, the guide surface, e.g. ramp or step is respectively overcome by a traversing region of the deflection curve when displaced, so that two regions of the energy guide, situated at different heights, are present, e.g. the deflection curve is height-offset relative to the height position of both strands, or the deflection curve extends obliquely, and both strands are height-offset to one another.

In one embodiment, at least the first strand can be guided between a side wall of the guide trough and the guide surface of the trough floor.

In a preferred embodiment, a distinct, separate guide surface can be arranged laterally adjacent to the bearing surface of the first strand, in particular extending along this surface. It is alternatively also possible to produce the at least one obliquely-extending guide surface at least partially or completely through the bearing surface of the first strand, i.e. the bearing surface then also has an at least partially oblique cross-section.

Preferably, the bearing surfaces extend essentially horizontally, or level. However, it can be provided that the bearing surface of at least one of the strands, preferably of both strands, has a cross-section that extends obliquely to the horizontal. In this case, both bearing surfaces can form acute angles relative to the horizontal, and in particular facing away from one another, e.g. in the range of 5 to 20°.

Preferably, the arrangement and design of the guide trough is symmetrical for both strands, or to a central longitudinal plane of the guide trough in order to facilitate a confusion-proof mounting process.

The guide surface(s) of the trough floor can form a step-like or continuously changing angle relative to the horizontal. A continuously changing angle is advantageous, in particular, in avoiding friction edges, and can be combined, in a particularly good manner, with bearing surfaces that likewise have an oblique cross-section.

Preferred is a symmetric configuration of the trough floor, in which the said floor comprises a distinct first guide surface on the bearing surface of the first strand, which counteracts a deviation of the first strand from its target location, and comprises a second distinct guide surface on the bearing surface of the second strand, which counteracts a deviation of the second strand out if its target location.

In this case, the bearing surfaces can extend in a manner laterally externally adjacent to the side walls, and the at least one or both guide surfaces can be provided between the bearing surfaces.

In a development, it is provided that the guide surface(s) is or are formed laterally on a connection surface, formed cross-sectionally convexly, between the bearing surfaces of both strands. The connection surface and/or the guiding surface can be a continuously convex surface, in particular an arcuately-curved surface, which merges into the step(s) or ramp(s).

An alternative, less preferred embodiment provides that the at least one guide surface extends laterally externally along one of the two side walls, and the bearing surfaces of both strands are provided between the said guide surface and the other opposite side wall. Just as well, this arrangement can be implemented to be symmetric with both guide surfaces for both strands, or asymmetric with one guide surface only from the catch-side driven first strand.

To reduce friction and/or wear, bearing rolls can be provided, by means of which at least the first strand rolls-off via its bearing surface, wherein the bearing rolls preferably are arranged in a manner to protrude from and beyond the trough floor stationary on the said floor, in order to not affect the displacement of the deflection curve. In the case that the strand laterally supports on the side wall, in particular in a slightly oblique course, it is advantageous if further support rolls are provided, by means of which at least the first strand rolls-off on a side wall. Such support rolls preferably can be attached to members of the energy guide, since these rolls are ineffective in the deflection curve.

For a good guide effect without excessive wear, it is advantageous when each guide surface bridges a height difference which amounts to 5 to 50% of the height dimension of the horizontally arranged energy guide. By contrast, the side walls should preferably have a height dimension of at least 75%, preferably at least 100%, of the height dimension of the lyingly-arranged energy guide in order to reliably hold the lying energy guide.

The further development according to the first aspect is suitable for both, linear paths, and curved, in particular circular displacement paths, i.e. of the energy guide is displaceable back and forth within the range of the rotary angle, when guided over a circular arc. For linear applications, the side walls and the trough floor extend linearly for the purpose of a linear guidance of the strands.

Due to the lying-on-the-side position of the energy guide—in a predetermined bending radius in the deflection curve of the energy guide—the clear distance between the side walls corresponds to at least the predetermined outside diameter of the deflection curve (other than in a typical vertical arrangement of the strands, where the side walls are arranged roughly at the distance of the member width plus clearance). It is advantageous for a good guidance along the side walls of the guidance trough, if the energy guide preferably is configured with a pre-stress and the clear distance between the side walls is larger than the predetermined outside diameter of the deflection curve. This achieves an "adaption" of the strands, or a non-contacting transition region at the deflection curve, which reduces noise, inter alia.

In terms of the manufacture, the trough floor which, according to the invention, is equipped with a guide surface can be realized in a cost-favorable manner if it comprises a formed sheet metal profile or consists thereof. By forming, the sheet metal profile can be designed in such a way that it constitutes the bearing surface and the at least one guide surface on the upper side. In this case, there is a high degree of freedom when selecting the geometry.

Preferably, a sheet metal of stainless steel combined with an energy guide having plastic members is used. The trough floor can, in particular, be designed integrally with the side walls, e.g. from an edged thin-wall sheet.

In most applications, the first strand is secured to a first connection point with its end side, and the second strand is secured to a second connection point with its end side, wherein the first connection point is moveable relative to the stationary second connection point. However, it is also conceivable that both connection points are moveable relative to one another. By the way, an application which is referred to as being "linear" here also includes a slight lateral movement transversally to a predominantly linear main displacement direction.

Second Aspect of the Invention

The invention further relates to a guide system for at least one supply line, including an energy guide with a plurality of members, which are respectively connected to one another in an articulated manner, so that the energy guide, in the configuration of a first strand, a second strand as well as a deflection curve connecting both strands, is displaceable back and forth. At a least a number of the members have at least one link-like side part with an inner and an outer main side. The guide system further comprises a guide trough with two laterally opposite side walls and a trough floor therebetween, wherein the side walls and the trough floor have a linear extent for the purpose of guiding the energy guide, and the energy guide is arranged lying on the side in the guide trough, with the outer main sides of both strands facing towards the trough floor. Each strand is respectively essentially linearly displaceable on a corresponding bearing surface of the floor.

According to the invention, it is provided here that the trough floor is equipped with at least one guide surface, which includes a step that acts against a deviation of the moved, or first, strand from its bearing surface and which causes a predetermined height difference to the bearing surface of the moved, or first, strand which is overcome by the deflection curve when displaced.

Besides the nominal bearing surface for each strand, the trough floor thereby forms a step-like obstacle, which counteracts an undesired lateral movement of at least the moved strand. Preferably, the guide surface forms an additional rise, in addition to the height of the step, which is to be overcome by the deflection are when displaced. This integrates a slight tilting movement in the trough floor, which presses transition regions of the strands, close to the deflection curve, against the side walls. In this case, the height difference formed by the guide surface can be overcome, when displacing through a transversing region of the deflection curve, so that two differently high regions of the energy guide exist. For example, the deflection curve can be guided in manner offset in height relative to the height position of both strands, or the deflection curve can extend obliquely, wherein the two strands can be offset in height relative to one another.

A further developed embodiment provides that the at least one guide surface includes, in addition to the step, a curved surface, or an inclined ramp plane or the like, which is configured to join the step and causes part of the height difference in the trough floor.

The at least one guide surface can include, in particular, a convexly curved surface, which is formed to adjoin the step and causes part of the height difference. Another part of the height difference is caused by the step, wherein the entire height difference preferably is smaller than a third (33%) of the height dimension of the lying strands.

The deflection curve can, in particular due to the shape of the guide surface, be guided offset in height above the bearing surfaces or higher than the nominal height position of both strands. In particular, the central region of the deflection curve can displace on the bearing surface offset in height relative to the height position of the two strands guided in the bearing surfaces.

It is preferred that the step, or guide surface, is arranged in such a way that the moved strand is guided between a side wall of the guide trough and the step. The bearing surfaces preferably are formed as a recess in the trough floor, which are adjacent to or border on the side walls.

The bearing surface of at least the first strand, preferably of both strands, can have an essentially horizontally-extending cross-section.

Features of the one aspect of the invention can be combined with the features of the other aspect of the invention in an advantageous manner.

The invention also relates to a guide trough for an energy guide, which is composed of multiple longitudinal segments or longitudinal portions, with in each case one trough floor according to the preceding exemplary embodiments.

The invention further relates to a segment for the construction of a guide trough for a line guiding system, which comprises at least one trough floor in accordance with one of the preceding exemplary embodiments.

The invention is particularly suitable—but not exclusively—for use in a linear portal unit for flexible production plants, with at least one linear axis and a handling device displaceable along the said axis. In this case, the portal unit can include a line guiding system according to one of the preceding exemplary embodiments, which, for the supply, is connected to the handling device.

BRIEF DESCRIPTION OF THE DRAWINGS

Further details, features and advantages of the invention result from the following detailed description of preferred exemplary embodiments by means of the attached drawings without limitation. The Figures show in.

DETAILED DESCRIPTION

Figure 2:
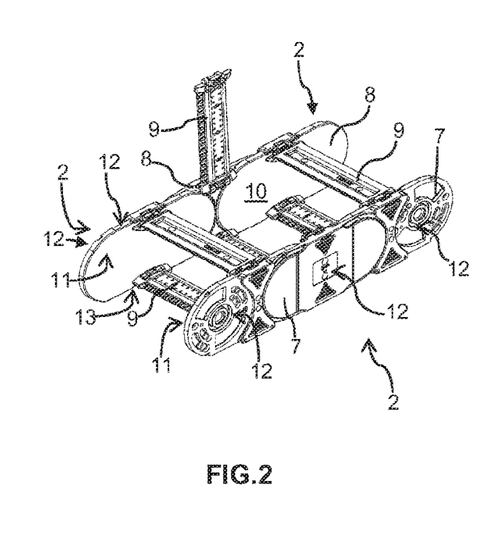
FIG. 2 is a perspective view of multiple chain members of an energy chain as an example of an energy guide.

FIGS. 1A to 1C schematically show a line guiding system which essentially consists of an energy chain 1 and a guide trough 20. The guide trough 20 guides the energy chain 1 when displaced. The energy chain 1 in turn guides lines, which are not shown in detail, and is composed of individual members 2 in a structure known per se (FIG. 2), which members are connected to one another respectively in an articulated manner Each member 2 can, for example, be composed of two side parts 7, 8 and two openings webs or cross pieces 9 (FIG. 2). The cross pieces 9 hold the side parts 7, 8 parallel to one another and can be produced integrally or detachably (openings webs) with these parts. Each side part 7, 8 has an inner main side 11 with respect to the inner space 10, and an outer main side 12 facing away from the said inner side. The side parts 7, 8 form narrow sides 13 on the long sides of the main sides 11, 12 extending essentially parallel to the longitudinal direction of the energy chain 1. By way of example, FIG. 2 shows an energy chain 1 with members 2 of alternating structure with four-part inner and outer links, i.e. predominantly the outer links provide planar outer main sides 12 (see FIG. 2). Other structures can likewise be considered, in particular the ones that form at least one chain-like strand of link-like side parts 7, 8.

The energy chain 1 is displaceable back and forth between a first end position of FIG. 1A and a second end position of FIG. 1B. In the exemplary embodiment of FIGS. 1A to 1C, the energy chain 1 is displaced corresponding to a linear displacement path (see double arrow L in FIG. 1B). The energy chain 1 forms a first strand 3A and a second strand 3B as well as a deflection curve 4, which connects the strands 3A, 3B. The deflection curve 4 maintains a predetermined bending radius R due to the construction of the members 2. In this way, the flexible lines (not shown) received in the inner space 10 of the energy chain 1 are protected particularly against kinking.

The first strand 3A is fastened, with its end side, to a catch 5, which is connected to the driven machine part and which is linearly moveable, by way of example, in FIGS. 1A to 1C. The second strand 3B is secured, with its end side, to a stationary fixed point 6, by way of example. Catch 5 and fixed point 6 form connection points that are relatively moveable to one another. Thus, as intended, the energy chain 1 actively guides the lines (not shown) from the fixed point 6 to the catch 5, which displaces back and forth, in this case corresponding to a linear displacement path L.

As can best be taken from FIG. 1C, the guide trough 20 has two essentially vertical side walls 21A, 21B as well as an interposed essentially horizontal and planar trough floor 22. According to the exemplary embodiment in FIGS. 1A to 1C, the energy chain 1 is arranged as lying on the side between the side walls 21A, 21B within the upwardly-open guide trough 20. In other words, the outer main sides 12 of the lower side parts 7 of the chain members 2 are facing the trough floor 22 in the lying arrangement. Accordingly, in this arrangement, the outer sides of the energy chain 1, with the narrow sides 13 or cross pieces 9 of the members 2, face the side walls 21A, 21B. Thus, in contrast to the typical arrangement of strands vertically above one another, both strands 3A, 3B can be displaced in a manner respectively supported on a corresponding bearing surface 23A, 23B of the trough floor 22. In FIGS. 1A to 1C, the bearing surfaces 23A, 23B are arranged on level or horizontally. Due to the fact that the catch 5 is displaced along a linear displacement direction L, the target course of the two strands 3A, 3B is respectively rectilinear or corresponds to a linearly-extending bearing surface 23A, 23B.

Even the single lying-on-the-side arrangement of an energy chain 1 permits long displacement paths, e.g. greater than 20 m, and/or very high accelerations without that the energy guide 1 could break out of the guide trough 20. This is generally advantageous for many applications with high displacement speeds or clock rates, amongst others in linear portal units, in particular portal robots for flexible production plants, as described in DE 10 2007 009 329 A1, for example.

Figure 3A:
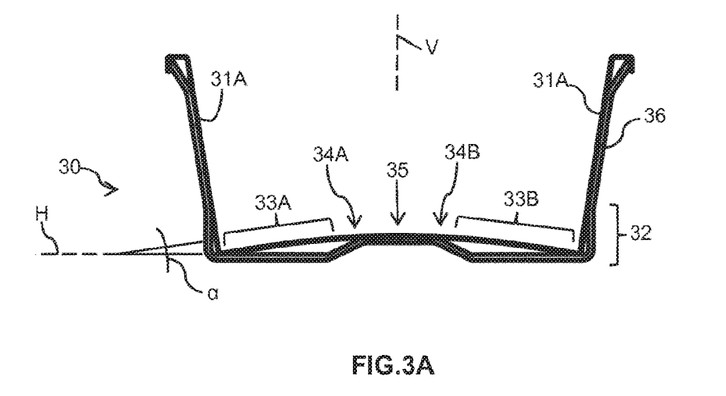
FIGS. 3A-3C are views of a line guiding system with an energy guide and a guide trough according to a first exemplary embodiment of the invention, in a cross-section (FIG. 3A), in a top view (FIG. 3B) or in a perspective view (FIG. 3C), wherein for the purpose of a better illustration of the details, only one segment or respectively only one longitudinal portion of the guide trough is shown.
Figure 3B:
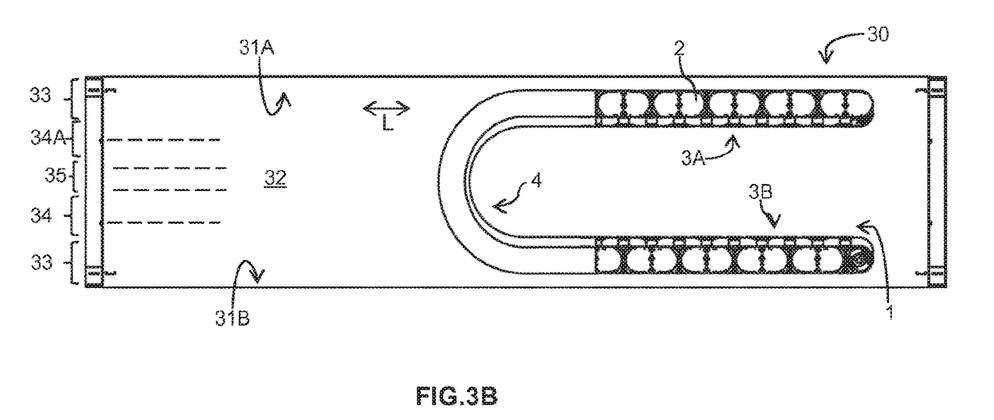
Figure 3C:
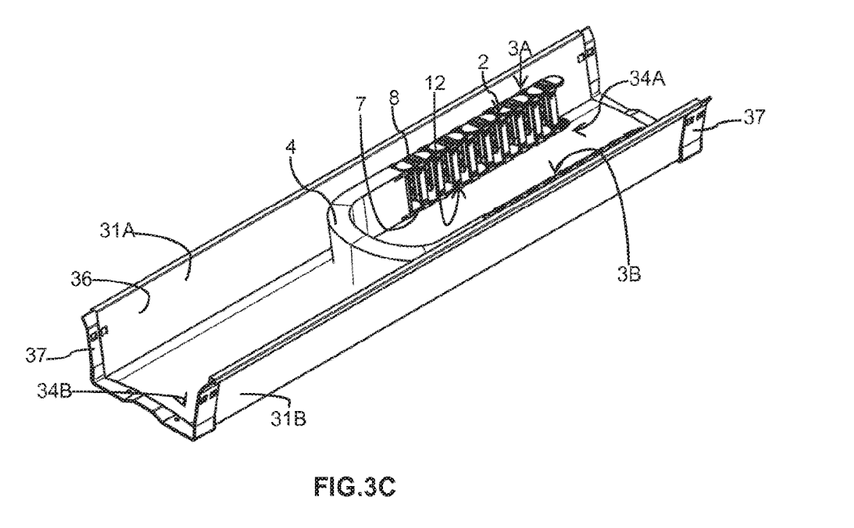

According to the invention, in a first exemplary embodiment in accordance with FIGS. 3A to 3C, a guide trough 30 is proposed, in which the trough floor 32 achieves an improved guidance of both strands 3A, 3B. Irrespective of the above, this first aspect can be applied not only to a linear displacement path L, but also to e.g. circular paths (not shown here, see WO 2013 007 631 A1, for example).

In the guide trough 30 of FIGS. 3A to 3C, both the first bearing surface 33A for the first strand 3A (only partially shown here) and the second bearing surface 33B for the second strand 3B (only partially shown here) are respectively arranged slightly oblique to the horizontal H, in this case mirror-symmetrically to the vertical V. The bearing surfaces 33A, 33B thus include an acute angle α to the horizontal H. The two side walls 31A, 31B of the guide trough 30 are approximately perpendicular to the respective adjacent bearing surface 33A or 33B, and thus slightly oblique to the vertical V, approximately at an angle α. The bearing surfaces 33A, 33B are slightly inclined downward to the outside toward the side walls 31A, 31B, i.e. the angles α to the horizontal H face away from one another.

Furthermore, in accordance with FIGS. 3A to 3C, an assigned pronounced guide surface 34A, 34B is respectively provided on the inner side of each bearing surface 33A, 33B in a manner bordering these bearing surfaces. Both guide surfaces 34A, 34B each also have a cross-section that extends obliquely in relation to the horizontal H (FIG. 3A), in this case convexly curved upward. The first guide surface 34A merges into the assigned bearing surface 33A laterally to the outside in a continuous manner. Likewise, a sudden transition with a slightly steeper step (see FIG. 7), or with a non-steadily changing angle to the horizontal H is conceivable. The same applies to the second guide surface 34B assigned to the second bearing surface 33B. The guide surfaces 34A, 34B are also mirror-symmetrical with respect to a central plane of the guide trough 30.

As can readily be taken from FIGS. 3A to 3C, the two guide surfaces 34A, 34B counteract a deviation of the respective strand 3A, 3B from the intended target location, in this case above the linearly extending bearing surfaces 33A, 33B, using gravity. As best shown in FIG. 3A, the two approximately steadily curved guide surfaces 34A, 34B are planarly connected to one another by a correspondingly convexly upwardly curved transition region 35. By the vertex of the transition region 35, a height difference is generated when compared to the position of the bearing surfaces 33A, 33B, which is to be overcome by the deflection curve 4. Merely the central region of the deflection curve 4 extends over this transition region 35 when displacing the energy chain 1 back and forth, whereby an inclined position of the strands 3A, 3B is created.

The slightly inclined course of the bearing surfaces 33A, 33B and also of the side walls 31A, 31B is adapted to the inclined position of the strands 3A, 3B, see FIG. 3C, which is generated by the height difference. On the whole, the guide surfaces 34A, 34B as inclined ramps, as well as the correspondingly convex bearing surfaces 33A, 33B, guide both strands 3A, 3B respectively laterally outward to the respective side wall 31A or 31B in the example of FIGS. 3A to 3C. A favorable course, in particular an adaption of the strands 3A, 3B to the side walls 31A, 31B can be supported when the clear width between the side walls 31A, 31B leaves a lateral clearance to the deflection curve 4 and the energy chain 1 is configured in a manner pre-stressed in the extended position of the strands 3A, 3B, so that the strands 3A, 3B tend laterally outward to the side walls 31A or 31B.

Figure 4A:
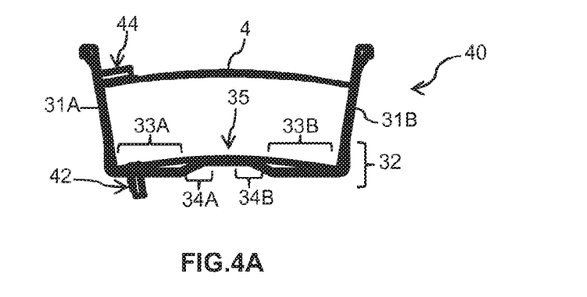
FIGS. 4A-4D are views of another exemplary embodiment of a line guiding system, in a cross-section (FIG. 4A), in a top view (FIG. 4B), in a perspective view (FIG. 4C) and in a side view (FIG. 4D), wherein two identically-constructed longitudinal segments of the guide trough are shown.
Figure 4B:
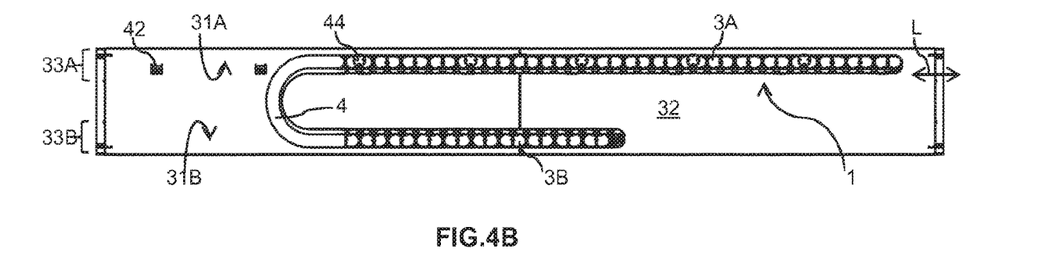
Figure 4C:
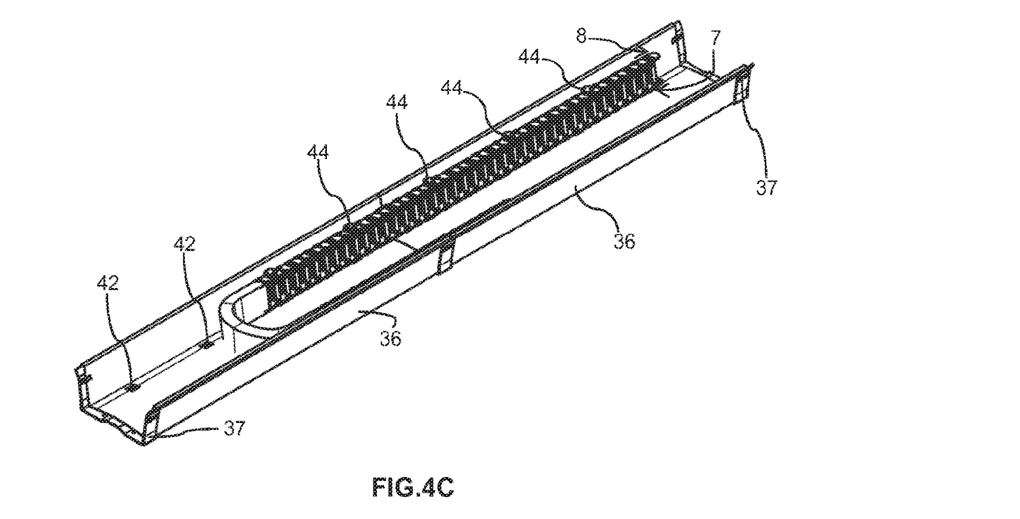
Figure 4D:
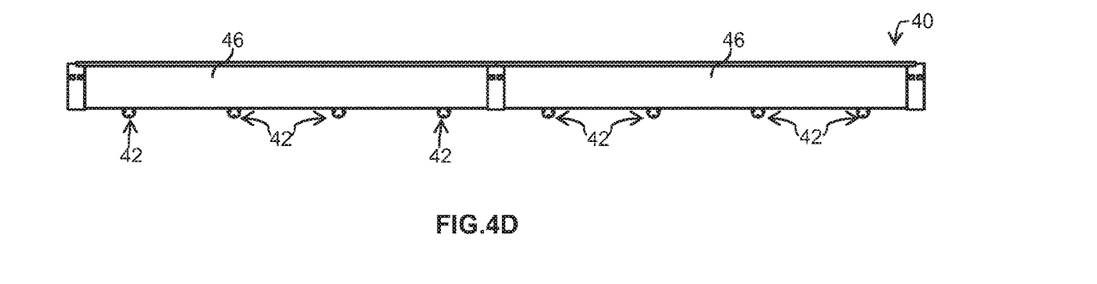

In the preferred embodiment of FIGS. 3A to 3C, the trough floor 32 is formed integrally with the side walls 31A, 31B from a thin metal sheet 36 in a forming process. The sheet metal 36 can advantageously be brought into the desired cross-sectional shape of the bearing surfaces 33A, 33B and of the guide surfaces 34A, 34B, e.g. by bending and edge bending in a cold forming process. Depending on the dimensions, other forming methods are possible. The trough floor 32 can also be generated e.g. by plastic parts, e.g. suitable inlays in a conventional trough. By means of additional holder elements 37 protruding on the face side, the metal sheet 36 is held and at the same time connected, in the longitudinal direction, with further corresponding metal sheets 36 to form a trough (see FIGS. 4C to 4D). A metal sheet 36 and at least one holder element 37 together form a longitudinal segment for the construction of a guide trough 30.

In the exemplary embodiment of FIGS. 3A to 3C, a sharp separation between the actual bearing surfaces 33A, 33B for the strands 3A, 3B, and the guide surfaces 34A, 34B laterally extending along these bearing surfaces does not exist. Just as well, the bearing surfaces 33A, 33B per se have a guiding effect due to the oblique cross-section, which counteracts an undesired course (schematically shown in FIG. 1A in a punctiform line) as with the actual guide surfaces 34A, 34B, i.e. the bearing surfaces 33A, 33B transition smoothly into the guide surfaces 34A, 34B, and vice versa. This prevents undesirable friction, wear and formation of noise.

In the development of FIGS. 4A to 4D, which is based upon the structure of FIGS. 3A to 3C, like reference characters are given to like parts. This guide trough 40 additionally has bearing rolls 42 only provided on the bearing surface 33A of the first strand 3A. The bearing rolls 42 are fastened to the trough floor 32 with rotary axes parallel to the bearing surface 33A, and protrude slightly vertically beyond the upper side of the bearing surface 33A. The bearing rolls 42 are provided at regular intervals, corresponding e.g. to every $n^{th}$ member 2. By means of the bearing rolls 42, the first strand 3A can roll-off via its bearing surface 33A, which compared to an arrangement with purely sliding main sides 12, as e.g. in FIGS. 1A to 1C or FIGS. 3A to 3C, makes even higher speeds or travel paths possible. Moreover, support rolls 44 can additionally be provided on the upper side part 8 (see FIG. 2), by means of which the first strand 3A can roll-off on the corresponding side wall 31A when displaced. The support rolls 44 are arranged on the main side 12 of the upper side part 8 with rotary axes approximately perpendicular to those of the stationary bearing rolls 42. The support rolls 44 can be configured as separate modules here, e.g. in accordance with DE 20 2014 104 550 U1 of the same applicant, the teaching of which is incorporated herein by reference, for retrofitting an energy chain 1 in a known construction. Apart from the bearing rolls 42 and corresponding recesses and holders on the shaped metal sheet, the structure of the guide trough 40 in FIGS. 4A to 4D is identical with the guide trough 30 of FIGS. 3A to 3C. However, FIGS. 4A to 4D show two segments 46 as components for the construction of the guide trough 40.

Figure 5A:
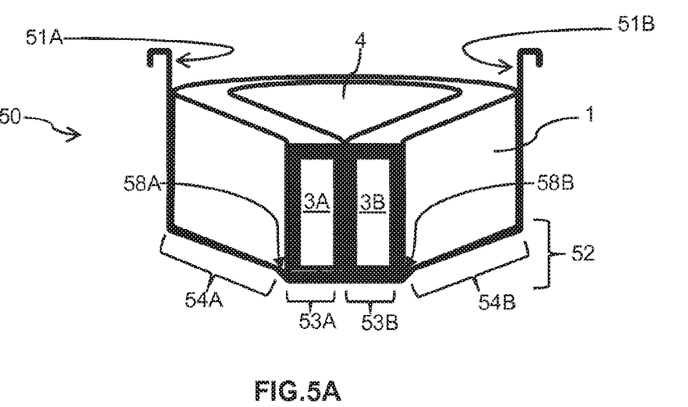
FIGS. 5A-5C are views of another exemplary embodiment of a line guiding system, in a cross-section (FIG. 5A), in a top view (FIG. 5B) or in a perspective view (FIG. 5C), respectively, wherein, for the purpose of a better illustration of the details, only one segment, respectively one longitudinal portion of the guide trough, is shown.
Figure 5B:
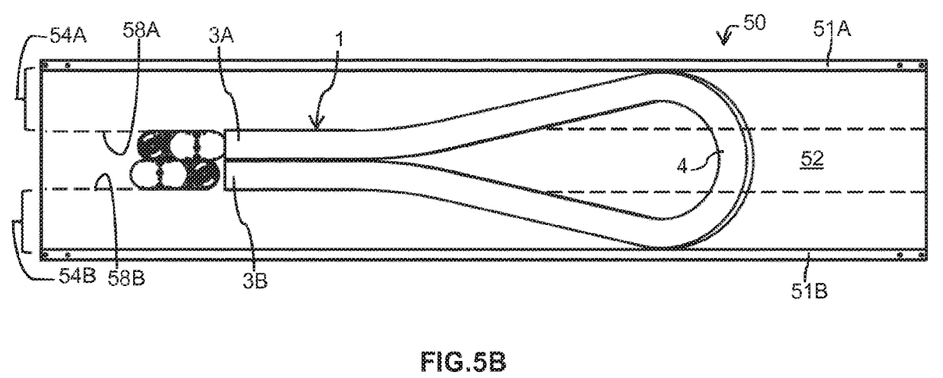
Figure 5C:
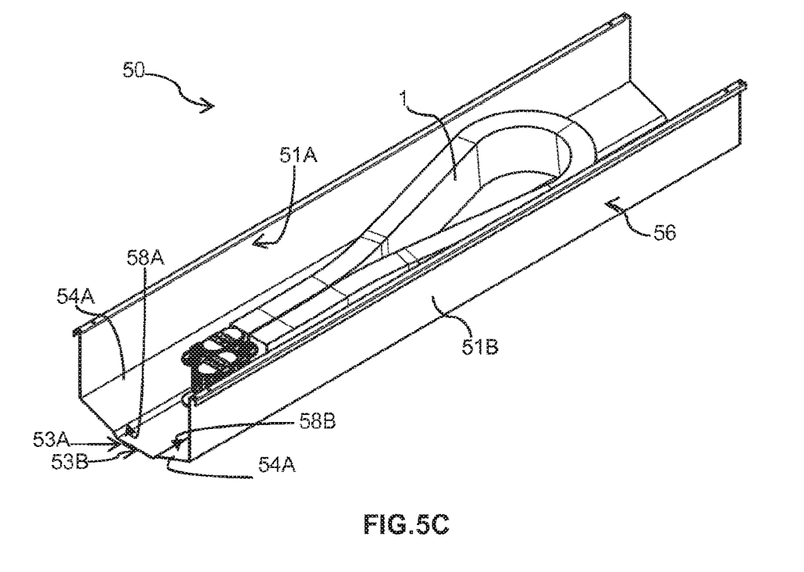

FIGS. 5a to 5c show another embodiment of a guide trough 50, configured mirror-symmetrically to the vertical V, with an energy chain 1 laterally-guided therein. Functionally-identical parts are provided with corresponding reference characters. The essential difference is that the bearing surfaces 53A, 53B do not extend laterally outside on the side walls 51A, 51B here, but centrally as a depression in the central region of the trough floor 52. The guide surfaces 54A, 54B, which are arranged as inclined planes, by contrast, extend from the bearing surfaces 53A, 53B outward and upward in an ascending manner to the side walls 51A, 51B in FIGS. 5A to 5C. Thus, the extended strands 3A, 3B (only partially shown) are located supported one against the other lower in relation side walls 51A, 51B when compared to FIGS. 3A to 3C, which even more reliably prevents a potential breaking-out with the same material effort. Moreover, FIG. 5C shows best that the ramp-like guide surfaces 54A, 54B respectively form a slightly inclined step 58A, 58B with a more steep angle at the transition to the bearing surfaces 53A, 53B, which further improves the guiding effect. The inclined ramp surface, which laterally outwardly adjoins on the guide surfaces 54A, 54B, can be configured more steeply than e.g. in FIGS. 3A to 3C. Correspondingly, the shaped metal sheet 56 has a different shape with a downwardly approximately U-shaped, concave cross-section.

Figure 6:
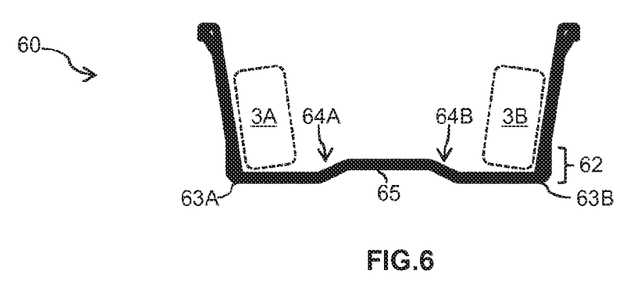
FIGS. 6 to 9 are schematic cross-sections on four other exemplary embodiments, which illustrate modifications of the principle of FIGS. 3A-3D.
Figure 7:
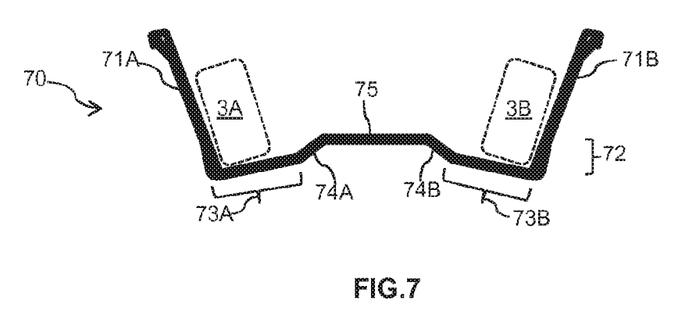

FIGS. 6 to 7 show, in a schematic cross-section, further variants of guide troughs 60; 70; 80; 90 according to the invention according to the first aspect, wherein only the strands 3A, 3B are shown with dashed lines.

In the guide trough 60 of FIG. 6, the guide surfaces 64A, 64B are configured as inclined ramps with unsteady edges to the horizontal bearing surfaces 63A, 63B and an approximately horizontal central plane 65 of the trough floor 62. In the modification of FIG. 7, the bearing surfaces 73A, 73B per se—similarly to FIGS. 3A to 3C—also have an inclined cross-section, and thus a guiding effect. In addition, pronounced, ramp-like guide surfaces 74A, 74B are provided, as in FIG. 6. The side walls 71A, 71B are approximately perpendicular to the bearing surfaces 73A, 73B and thus more inclined than in FIG. 6.

Figure 8:
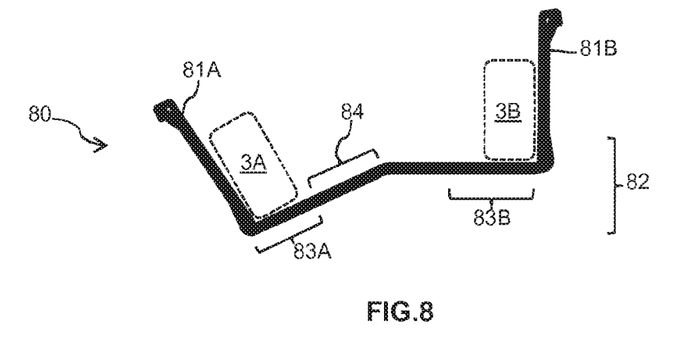
Figure 9:
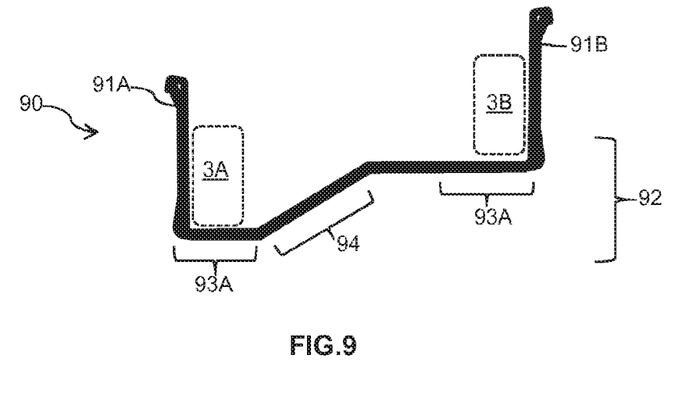

FIG. 8 shows an asymmetric configuration, in which an assigned guide surface 84 is provided only for the driven strand 3A. The bearing surface 83A can be an integral part of the inclined bearing surface 84, or transition smoothly into the said surface. The embodiment of FIG. 8 can, for example, be generated by an approximately central chamfering of an existing trough geometry. The bearing surface 83B for the strand 3B, which is secured stationary to the fixed point, is horizontal and, in FIG. 8, does neither have a guiding effect nor an assigned guide surface. In the likewise asymmetrical variant of FIG. 9, the bearing surfaces 93A, 93B are both horizontal, and only the driven strand 3A is assigned to a ramp-like inclined guide surface 94. The transition between guide surfaces 84, 94 and bearing surfaces 83A, 83B; 93A, 93B can be rounded.

Figure 10A:
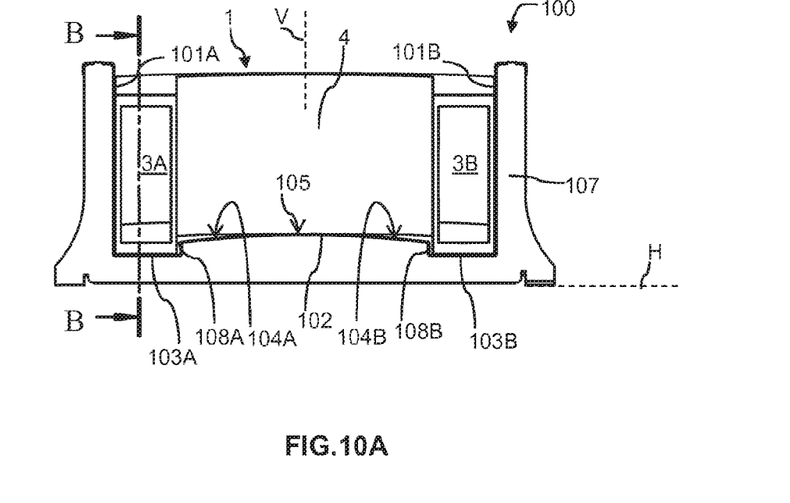
FIGS. 10A-10C are views of a particularly preferred further exemplary embodiment of a line guiding system, in a cross-section (FIG. 10A), in a longitudinal portion according to sectional lines B-B (FIG. 10) and in a perspective view (FIG. 10C), wherein, for the purpose of a better illustration, only one segment, respectively one longitudinal portion of the guide trough is shown.
Figure 10B:
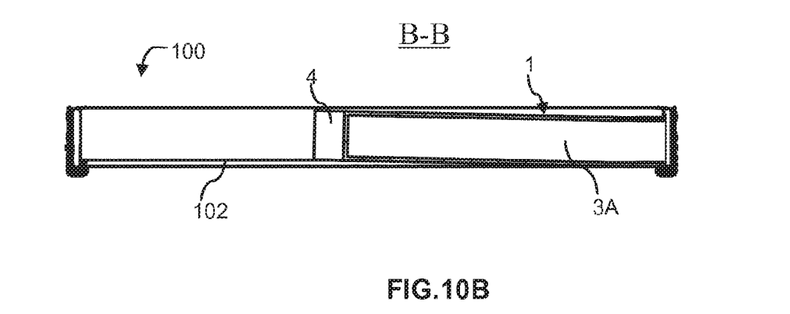
Figure 10C:
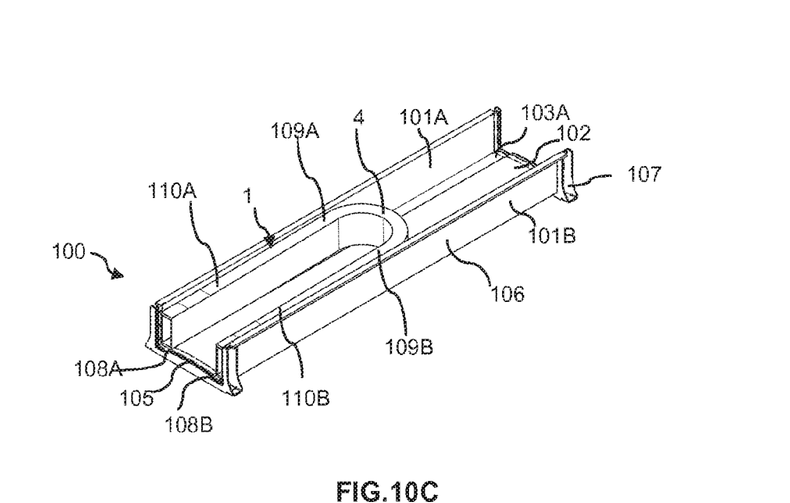

FIGS. 10A to 10C show a further, particularly preferred embodiment of a guide trough 100, configured mirror-symmetrically to the vertical V, with an energy chain 1 guided therein in a manner lying on the side. The guide trough 100 in FIGS. 10A to 10C is a development or variant of FIGS. 3A to 3C, functionally-identical parts are denoted with corresponding reference characters. The bearing surfaces 103A, 103B extend in a horizontal plane, or parallel to the horizontal H along and bordering on the side walls 101A, 101B of the guide trough 100. The side walls 101A, 101B are approximately perpendicular to the respectively adjoining bearing surface 103A or 103B. The guide surfaces 104A, 104B arranged between the two bearing surfaces 103A, 103B extend in the longitudinal direction of the guide trough 100 respectively laterally adjacent to the assigned bearing surfaces 103A, 103B. The guide surfaces 104A, 104B form an unsteady transition to the bearing surfaces 103A, 103B, in each case by an essentially vertical step 108A; 108B, which improves the guiding effect. Thus, the bearing surfaces 103A, 103B extend as trough-shaped depressions in the trough floor 102 along the side walls 101A, 101B, laterally bordered by the side walls 101A, 101B and steps 108A, 108B. The guide surfaces 104A, 104B are bend or curved toward the center with an angle, relative to the horizontal H, continuously changing in the cross-section of the trough floor 102, starting from the steps 108A, 108B toward a central transition region 105, they are inclined downward and laterally outward to the bearing surfaces 103A, 103B. Both guiding surfaces 104A, 104B are also mirror-symmetrical to the perpendicular longitudinal central plane of the guide trough 100 in FIGS. 10A to 10C. One guide surface 104A transitions smoothly into the other guide surface 104B. In this way, the guide surfaces 104A, 104B form a continuously curved convex surface and the trough floor 102 comprises a central, convex connecting surface in the transition region 105, which connects the two guide surfaces 104A, 104B. The surface formed by the guide surfaces 1043A, 104B and their transition region 105 is approximately in the shape of a circular arc, viewed in the cross-section, with a curvature radius which preferably corresponds to at least twice the internal width between the side walls 101A, 101B. In this case, the transition region 105 forms a higher region, on which the deflection curve 4 displaces. Thus, in this exemplary embodiment as well, the two extended strands 3A, 3B (only partially shown) are located lower in relation to the deflection curve 4, so that the gravity can counteract a potential out-breaking of a driven strand 3A, 3B, the height difference is 10 to 20% of the height of the strands 3A, 3B along the vertical V here. Only the central region of the deflection curve 4 respectively extends in contact with the higher-located transition region 105 upon displacement of the energy chain 1 back and forth. As a result, the transition portions 109A, 109B, of the two strands 3A, 3B, merging into the deflection curve 4 are displaced slightly lifted. Thus, the transition region 105 forms the highest point of the guide trough 100, on which only the central region of the deflection curve 4 is displaced, namely located higher than the longitudinal portions 110A, 110B on the bearing surfaces 103A, 103B. As a result, the transition portions 109A, 109B of the two strands 3A, 3B are lifted in a contact-less manner above the steps 108A, 108B, i.e. undesirable friction and wear on the edges of the steps 108A, 108B is prevented.

FIGS. 10A to 10C only show one longitudinal portion or a segment 106 as a component for the construction of the guide trough 100. The segment 106 is equipped with holding elements 107 on the face side, which can serve as connectors for connecting with further identically-constructed segments 106 to the guide trough 100. The trough floor 102 can be produced as an integral deformed metal sheet, e.g. made of stainless steel. The holder elements 107 can be produced as plastic molded parts. The guide trough 100 can comprise a roofing (not shown) as a protection against dirt.

In place of a preferred energy chain 1 composed of members 2 with in each case two opposite side links or side parts 7, 8, as in FIGS. 1 to 9 or FIG. 10, any suitable construction type of an energy guide can be employed. Not exclusively, but also suitable, for example, are energy guides in which each member respectively has only one side link per member in accordance with patent EP1340299B1 or the principle of the product series "SnapChain©", or patent EP0954710B1 or the principle of the product series "TwisterChain©" of the applicant. The teachings of these patents in terms of the construction type of the energy guide is hereby incorporated in the present specification. In the case of robust, box-like energy chains 1, as in FIG. 2, by contrast with FIG. 10, a planar, stress-free bearing of the deflection curve 4 on the floor 22 can selectively be achieved despite the height difference in the aspect of FIGS. 2 to 9. To that end, an energy chain 1 can be used, in which the members 2 form joint connections with special, slot-like or oval joint receptacles, which permit a movement of the strands 3, 4 and thus of the deflection curve 4 sideward transversally to the longitudinal direction, i.e., in the arrangement proposed here, approximately in the vertical direction. Such an energy chain 1 is disclosed by the patent EP1108157B1 of the same applicant, the teachings of which in this regard are incorporated herein as well (see FIG. 6 there).

LIST OF REFERENCE CHARACTERS

FIGS. 1A-1C and FIG. 2
1 energy chain
2 members
3A first strand
3B second strand
4 deflection curve
5 catch
6 fixed point
7 lower side part
8 upper side part
9 cross piece
10 inner space
11 inner main side
12 outer main side
13 narrow side
20 guide trough
21A, 21B side walls
22 trough floor
23A, 23B bearing surface
L displacement direction
R bending radius
FIGS. 3A-3C
1 energy chain
2 members
3A first strand
3B second strand
4 deflection curve
12 main side
30 guide trough
31A, 31B side walls
32 trough floor
33A first bearing surface (for first strand)
33B second bearing surface (for second strand)
34A first guide surface
34B second guide surface
35 transition region
36 shaped metal sheet 37 holder elements
α acute angle
H horizontal
V vertical
FIGS. 4A-4D
1 energy chain
3A first strand
3B second strand
4 deflection curve
40 guide trough
31A, 31B side walls
32 trough floor
33A first bearing surface (for first strand)
33B second bearing surface (for first strand)
34A first guide surface
34B second guide surface
35 transition region
42 bearing rolls
44 support rolls
46 segments
FIGS. 5A-5C
1 energy chain
3A first strand
3B second strand
4 deflection curve
50 guide trough
51A, 51B side walls
52 trough floor
53A first bearing surface (for first strand)
53B second bearing surface (for second strand)
54A first guide surface
54B second guide surface
58A, 58B step
FIGS. 6-9
3A first strand
3B second strand
60;70;80;90 guide trough
61A; 61B; 71A, 71B; 81A; 81B; 91A; 91B side walls
62; 72; 82; 92 trough floor
63A, 63B; 73A, 73B; 83A, 83B; 93A, 93B bearing surfaces
64A, 64B; 74A, 74B; 84; 94 guide surface
FIGS. 10A-10C
1 energy chain
3A first strand
3B second strand
4 deflection curve
100 guide trough
101A, 101B side walls
102 trough floor
103A first bearing surface (for first strand)
103B second bearing surface (for second strand)
104A first guide surface
104B second guide surface
105 transition region
107 holder elements
108A, 108B step
109A, 109B transition portions (of the strands)
110A, 110B longitudinal portions (of the strands)

What is claimed is:

1. A guide trough for a line guiding system comprising an energy guide having a deflection curve with a predetermined bending radius disposed between strands, the guide trough comprising:
    at least one segment comprising two laterally opposite side walls and a trough floor therebetween,
    wherein the energy guide chain is arrangeable between the side walls of the at least one segment such that an outer main side of each of the strands faces towards the trough floor,
    wherein a clear distance between the side walls of the at least one segment corresponds to at least a predetermined outside diameter of the deflection curve, such that each strand of the strands is to be respectively displaceable on a corresponding bearing surface of the trough floor,
    wherein the trough floor comprises at least one guide surface with a ramp and/or a step, the at least one guide surface arranged laterally adjacent to the bearing surface of at least one strand of the strands and having a height difference relative to the adjacent bearing surface to counteract a deviation of at least one of the strands out of the corresponding bearing surface,
    wherein the ramp, cross-sectionally, is oblique to horizontal, and/or the step, cross-sectionally, is substantially vertical.

2. The guide trough according to claim 1, wherein the strands of the energy guide comprise a first strand, and
    wherein the at least one segment is configured such that at least the first strand is to be guided between one of the side walls and the at least one guide surface.

3. The guide trough according to one of claim 1, wherein the at least one segment is configured such that the bearing surface of at least one of the strands has a substantially horizontally-extending cross-section.

4. The guide trough according to claim 1, wherein the strands of the energy guide comprise a first strand and a second strand,
    wherein the at least one guide surface comprises a first guide surface and a second guide surface,
    wherein the first guide surface is arranged laterally adjacent the bearing surface of the first strand, the first guide surface to counteract a deviation of the first strand out of the bearing surface out of the first strand, and
    wherein the second guide surface is arranged laterally adjacent the bearing surface of the second strand, the second guide surface to counteract a deviation of the second strand out of the bearing surface of the second strand.

5. The guide trough according to claim 4, wherein each of the bearing surfaces of the first and second strands extend laterally and externally border on one of the side walls, respectively, and the first and second guide surfaces are provided between the bearing surfaces of the first and second strands.

6. The guide trough according to claim 5, wherein the first and second guide surfaces are formed laterally on a cross-sectionally convexly-curved connecting surface between the bearing surfaces of the first and second strands.

7. The guide trough according to claim 1, wherein the at least one segment comprises bearing rolls or support rolls, by which at least one of the strands is rollingly supported.

8. The guide trough according to claim 1, wherein the height difference is configured to be in a range of 5% to 50% of a height dimension of the energy guide when the energy guide is arranged between the side walls of the at least one segment such that outer main sides of the strands face towards the trough floor.

9. The guide trough according to claim 1, wherein the side walls and the trough floor extend linearly to linearly guide the strands.

10. The guide trough according to claim 1, wherein the clear distance between the side walls is configured to be greater than the predetermined outer diameter of the deflection curve.

11. The guide trough according to claim 1, wherein the trough floor comprises a shaped sheet-metal profile, which, on an upper side, comprises the bearing surfaces and the at least one guide surface.

12. The guide trough according to claim 1, wherein the trough floor is manufactured in one-piece with the side walls.

13. The guide trough according to claim 1, wherein the trough floor comprises the step, wherein the at least one guide surface includes a convexly-curved surface, which adjoins the step and provides part of the height difference.

14. The guide trough according to claim 1, wherein the trough floor comprises the step, wherein the step is arranged such that one of the strands is to be guided between a side wall of the guide trough and the step.

15. The guide trough according to claim 1, wherein the at least one guide surface is configured such that a middle region of the deflection curve is disposable on the at least one guide surface in a manner height-offset relative to a height position of the strands guided on the corresponding bearing surfaces.

16. The guide trough according to claim 1, wherein the bearing surface of at least one strand has a substantially horizontally-extending cross-section, and is formed as a recess in the trough floor, which border on one of the side walls.

17. The guide trough according to claim 1, wherein the at least one segment comprises a plurality of segments.

18. A line guiding system for at least one supply line, comprising:
    an energy guide comprising a plurality of members, which are respectively connected to one another in an articulatable manner, such that the energy guide has a deflection curve disposed between stands,
    a guide trough according to claim 1,
    wherein the energy guide is arranged between the side walls of the at least one segment of the guide trough such that an outer main side of each of the strands faces towards the trough floor.

19. A linear portal unit for a production plant, comprising:
    at least one linear axis and a handling device displaceable thereon,
    a line guiding system according to claim 18 for at least one supply line connected to the handling device.

20. A guide trough for a line guiding system comprising an energy guide having a deflection curve with a predetermined bending radius disposed between strands, the guide trough comprising:
    at least one segment comprising two laterally opposite side walls and a trough floor therebetween,
    wherein the energy guide chain is arrangeable between the side walls of the at least one segment such that an outer main side of each of the strands faces towards the trough floor,
    wherein a clear distance between the side walls of the at least one segment corresponds to at least a predetermined outside diameter of the deflection curve, such that each strand of the strands is to be respectively displaceable on a corresponding bearing surface of the trough floor,
    wherein the trough floor comprises at least one guide surface with a ramp and/or a step, the at least one guide surface arranged laterally adjacent to the bearing surface of at least one strand of the strands and having a height difference relative to the adjacent bearing surface to counteract a deviation of at least one of the strands out of the corresponding bearing surface,
    wherein the trough floor comprises a shaped sheet-metal profile, which, on an upper side, comprises the bearing surfaces and the at least one guide surface.

21. A guide trough for a line guiding system comprising an energy guide having a deflection curve with a predetermined bending radius disposed between strands, the guide trough comprising:
    at least one segment comprising two laterally opposite side walls and a trough floor therebetween,
    wherein the energy guide chain is arrangeable between the side walls of the at least one segment such that an outer main side of each of the strands faces towards the trough floor,
    wherein a clear distance between the side walls of the at least one segment corresponds to at least a predetermined outside diameter of the deflection curve, such that each strand of the strands is to be respectively displaceable on a corresponding bearing surface of the trough floor,
    wherein the trough floor comprises at least one guide surface with a ramp and/or a step, the at least one guide surface arranged laterally adjacent to the bearing surface of at least one strand of the strands and having a height difference relative to the adjacent bearing surface to counteract a deviation of at least one of the strands out of the corresponding bearing surface,
    wherein the trough floor comprises the step, wherein the at least one guide surface includes a convexly-curved surface, which adjoins the step and provides part of the height difference.

* * * * *